Jan. 30, 1940.　　　G. E. CANNON ET AL　　　2,188,767
CEMENT AND CEMENTING OPERATION
Filed July 25, 1936
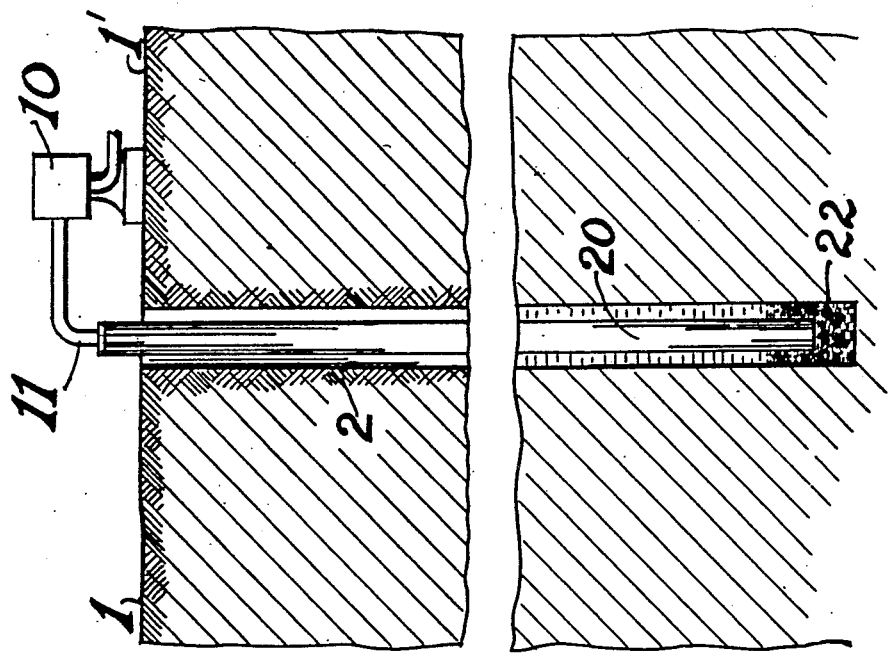
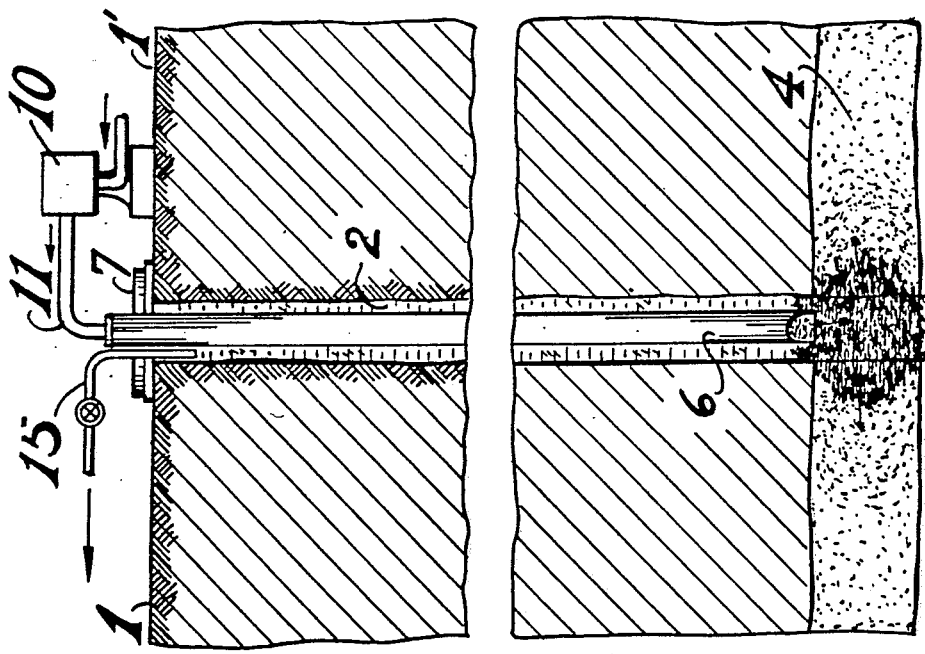
George E. Cannon
James L. Foster
Inventors
By W. E. Weigester Attorney Patented Jan. 30, 1940

2,188,767

UNITED STATES PATENT OFFICE 2,188,767

CEMENT AND CEMENTING OPERATION

George E. Cannon and James L. Foster, Houston, Tex., assignors to Standard Oil Development Company, a corporation of Delaware Application July 25, 1936, Serial No. 92,502

7 Claims. (Cl. 166—21)

This invention relates to improvements in cement and cementing operations such as cementing oil wells.

In some cementing operations it is desirable to use either an inorganic cement slurry such as Portland cement slurries, or a mixture of cement, gravel, and sand which will have a relatively low viscosity and slow initial setting time. In the past, these objectives have been sought by various means, but with a resultant reduction in the tensile strength of the cement. The Portland cement ordinarily used has been of such nature that the setting time may be too fast or the viscosity of the slurry may be so high that the cement is hard to handle. For example, ordinary Portland cement sets too quickly at high temperatures for use in cementing deep wells in which the cement is passed down through the extent of the wells (sometimes more than 10,000 feet deep) and is forced into the annular spaces between the casing and the hole. Temperatures encountered increase with depth; often-times temperatures are encountered high enough to cause the cement to set before it is placed. It is not uncommon for the temperatures to exceed 150° F. in a well. Often, when the cement can be placed satisfactorily, placement pressures are high enough to make the operation difficult due to the high viscosity of the cement slurry. The placement pressures may run as high as 2,000 lbs./sq. in. In some cases, it is desirable to pump or place the cement in small cavities or porous formations and it is necessary to use a cement having a low viscosity and a slow setting time with a high tensile strength.

It is an object of this invention to provide a cement which will have an increased initial setting time and a reduced viscosity without sacrificing tensile strength of the cement.

Another object is to provide an improved method of cementing off casing, porous formations, or the like, in a well at temperatures above atmospheric.

Other objects will be apparent from the specification and from the accompanying drawing, in which latter—

Fig. 1 is a vertical sectional view through the earth, showing a bore hole or well containing drill pipe, traversing a porous formation and apparatus for cementing off the porous formation, and Fig. 2 is a vertical sectional view through the earth, showing the bore hole and the application of the invention to use in cementing off a well casing.

In carrying out this invention, a material of the class consisting of carbocyclic sulfonic acids or an organic material of feebly acidic properties is added to the cement. Preferably the cement is Portland cement or its equivalent, consisting, as is well known, predominantly of basic lime salts of silica and alumina and ferro aluminates. By Portland cement is meant the cement defined by the "American Society for Testing Materials", designation C-9 of 1930. Portland cement is the product obtained by finely pulverising clinker produced by calcining to incipient fusion an intimate and properly proportioned mixture of argillaceous and calcareous materials, with no additions subsequent to calcination excepting water and calcined or uncalcined gypsum. Other cements of this type may be used.

Of the carbocyclic sulfonic acids, it has been found that a mixture of sulfonic acids is effective which is obtained from the sludge from fuming acid treatment of petroleum oils, which mixture is freely soluble in water in the presence of oil, only partially soluble in ether and freely soluble in amyl alcohol, and has a combining weight of approximately 360. Such a mixture of sulfonic acids is described in the United States Patent No. 1,474,933, patented November 20, 1923, entitled "Water soluble sulfonic acids from petroleum oils and method of producing the same." This mixture of sulfonic acids is prepared by treating petroleum oil with strong sulfuric acid, drawing off the resultant acid sludge, washing the sludge with hydrocarbon oil, diluting the same with water, heating, settling and drawing off the sulfuric acid layer, thereby separating out the sulfonic acids, and purifying the latter. A further description of the method of preparing the mixture of sulfonic acids is disclosed in the above patent. The mixture of sulfonic acids may also be prepared from the Edeleanu extract obtained in the sulfur dioxide treating of kerosene or other petroleum oil. The acids contained in this mixture are primarily aromatic in nature and consist, for the most part, of individuals containing some 16 to 20 carbon atoms per molecule. For example, a fraction isolated from the mixture was found to conform to the general formula $C_{N2}H_{2N-18}SO_3$. It has been found that the barium salts of these acids are, for the most part, water insoluble. A fraction whose barium salts are water soluble has been found to conform to the general formula, $C_NH_{2N-16}SO_3$, where N was 14. The sodium salts of this latter fraction have been found to be several times more effective than the sodium salts of all the acids disclosed in the United States Patent No. 1,474,933, in reducing the viscosity and increasing the setting time of Portland cement slurries. The mixture of acids of the above patent in its original state, is highly acid due to the presence of free sulfuric acid, and before adding this material to cement, it is desirable to neutralize the free sulfuric acid and convert the sulfonic acids into their alkaline salts by the addition of alkali. Carbocyclic sulfonic acids from any source are within the scope of this invention.

By way of specific example, a Portland cement slurry containing 40 grams of water per 100 grams cement can be treated with from ½ to 3 parts of a solution of alkali-neutralized mixture of sulfonic acids disclosed in the above patent (by volume), containing some 25% of alkali sulfonates, to each 100 parts of cement slurry to obtain the desired results. In this case, the freshly mixed cement slurry, before treatment with the mixture of sulfonic acids had the following characteristics on the Stormer viscosimeter:

| Driving weight, grams | R. P. M. |
| --- | --- |
| 500 | 500 |
| 400 | 214 |
| 300 | 100 |

When treated with one part of the neutralized mixture of sulfonic acids (by volume) per 100 parts of cement, the slurry had the following viscosity characteristics:

| Driving weight, grams | R. P. M. |
| --- | --- |
| 500 | 750 |
| 400 | 500 |
| 300 | 200 |

The tensile strengths of samples of this cement slurry to which the mixture of sulfonic acids had not been added was, at room temperature at one, three, and seven days:

| Time, days | Strength, lbs./sq. in. |
| --- | --- |
| 1 | 200 |
| 3 | 335 |
| 7 | 460 |

After treatment with one part of the neutralized mixture of sulfonic acids (by volume) to 100 parts of cement slurry, the tensile strengths, at room temperature, for the same periods of time were:

| Time, days | Strength, lbs./sq. in. |
| --- | --- |
| 1 | 195 |
| 3 | 330 |
| 7 | 440 |

The above described untreated cement was allowed to set at 66° C. and attained its initial set in two hours, and final set in two and one-half hours, as determined by a Gilmore needle as defined by the "American Society for Testing Materials", designation C–77–32. After treatment with one part of the neutralized mixture of sulfonic acids, as above described, the cement reached the initial set in three hours and final set in three and one-half hours.

The organic material of feebly acidic properties which is added to cement to increase the initial setting time and reduce the viscosity without sacrificing tensile strength, includes the following classes of organic materials, their alkali salts; including humic acid, lignic acid, tannic acid, quercitannic acid, various phenol compounds, such as pyrogallol and the like. Extracts, solutions, and distillates of lignins, humins, tannates, extracts of woods, such as chestnut, sumac, quebracho, cork, and extracts of peat, straw, and cereals may be used.

It is not necessary that the compounds be pure and it is contemplated to use compounds of this nature derived from whatever source is available, such as by-products of the paper and cereal industries. Chestnut extract and the lignins from the alkaline extraction of rice hulls are other sources of these materials. The tannic acid, gallic acid or the like may be used as a vegetable extract such as is used in the tanning and other industries. For example, the following commercial extracts have been found suitable:

Quebracho
Divi divi
Gambier
Spruce
Sumac
Chestnut extracts

It is desirable to render the treating solution distinctly alkaline by the addition of alkali; however, the amount of excess alkali can be varied considerably. The alkaline material may be sodium hydroxide, potassium hydroxide, calcium hydroxide, or the like.

For example, a cement slurry which contained 35 cc. of water per 100 grams of cement attained its initial set at atmospheric temperature in 4⅓ hours, and its final set in 14 hours, as determined by a Gilmore needle. When the same slurry was treated with 1 cc. of a solution which contained 5% quebracho and 5% caustic soda (by weight), to each 100 grams of cement, the initial set was attained in 8 hours, and the final set in 15½ hours. A sample of the same cement slurry, untreated with quebracho and caustic, when allowed to set at 66° C. reached its initial set in 1½ hours and its final set in 2 hours, and after treatment with the same amount of treating solution mentioned above, the initial set at 66° C. was attained in 2½ hours and final set in 3¾ hours. The tensile strengths at the end of one, three, and seven days of the above untreated sample, cured at atmospheric temperature, were 300, 580 and 663 lbs./sq. in., respectively. After treatment with alkaline quebracho solution, as above described, the tensile strengths at atmospheric temperature, after the same periods of time, were 315, 518 and 609 lbs./sq. in. When cured at 66° C., the above untreated cement had tensile strengths at the end of one, three and seven days of 205, 377 and 422 lbs./sq. in. The sample treated with alkaline quebracho at the concentration mentioned above had tensile strengths of 262, 415 and 450 lbs./sq. in. at the end of one, three and seven days.

The viscosity changes due to chemical treatment of the above cement are shown in the following table:

*Untreated cement*

| Driving weight, grams | R. P. M. |
| --- | --- |
| 500 | 96 |

After adding 1 cc. of alkaline quebracho per 100 gms. of cement:

| Driving weight, grams | R. P. M. |
| --- | --- |
| 500 | 222 |
| 400 | 143 |
| 300 | 73 |

Considerable variation in the setting time and viscosity of the slurry can be obtained by varying the concentration of treating agent in the cement slurry. In general, the setting time is increased and the viscosity is reduced by increasing the concentration of the treating agent in the mixture.

The compositions described have slow initial set, low viscosity, and have particular application to the cementing of deep oil wells where the temperatures are high and untreated cement sets very rapidly, often setting before the cement can be placed in the bottom of the well. The cement mixes faster, can be placed faster at lower placement pressures than when the cement has not been treated according to this invention.

Referring to Fig. 1, the use of the above cement in cementing off a porous subsurface stratum is illustrated, in which reference numbers 1 and 1' designate the surface of the earth, 2 designates a bore hole or well which traverses a porous stratum 4. The drill pipe 6 is supported in the hole by means of a rotary table assembly 7. During drilling operations, drilling fluid is forced by means of a pump 10 and line 11, through the drill pipe 6, into the hole and is discharged through the line 15 from the hole, in order to cement off the porous stratum 4. Cement is pumped through the line 11 into the drill pipe 6, displacing the drilling fluid and filling the hole adjoining the porous stratum. The outlet line 15 is ordinarily closed and the continued pumping forces the cement laterally into the porous stratum. The temperatures of the porous stratum may exceed 66° C. and the pressures placed upon the cement and drilling mud may run as high as 2,000 lbs./sq. in. The cement constituting the subject matter of this invention having a low viscosity as above described, can be handled readily throughout the extent of the drill pipe and flows readily into the porous formation; furthermore, the delay in setting permits of handling it for the necessary length of time with increased facility.

Referring to Fig. 2, the invention is illustrated as applied to cementing off a well casing. In this figure, the well casing is designated as 20, and is connected to an inlet line 10. Before cementing off the well casing, the casing ordinarily contains drilling mud and the space between the casing and the walls of the well also contain drilling mud. In cementing off casing, the cement is forced down the casing, displacing the drilling mud, and the cement is forced upwardly around the casing. The cement is indicated as 22. The temperatures of the stratum adjoining the well and of the contents of the well at the depths contemplated may run as high as 200° F. Also, the depths contemplated may be over 10,000 feet. The cement constituting the subject matter of this invention has an increased initial setting time and a reduced viscosity under these relatively high temperatures. Consequently, the cement can be handled at the necessary temperature and for the time necessary to place it in the porous formation with increased facility. Also, the tensile strength of the cement has not been sacrificed and a minimum amount of it can be used for holding the casing in place.

While the invention has been described as applied to the cementing off of porous subsurface strata, and the cementing of well casing, it will be understood that it can be used for any purpose requiring increased initial setting time and reduced viscosity and some of the advantages of the invention will be attained.

Various changes and alternate arrangements may be made within the scope of the appended claims, in which it is our intention to claim all novelty inherent in the art as broadly as the prior art permits.

We claim:

1. A Portland type cement to which has been added a solution of caustic alkali and tannic acid in amounts which will retard the initial set and reduce the viscosity of the cement.

2. A Portland type cement to which has been added a solution of caustic alkali and quebracho in amounts which will retard the initial set and reduce the viscosity of the cement.

3. A Portland type cement to which has been added a solution of caustic alkali and gallic acid in amounts which will retard the initial set and reduce the viscosity of the cement.

4. A Portland type cement to which has been added a solution of caustic alkali and humic acid in amounts which will retard the initial set and reduce the viscosity of the cement.

5. A Portland type cement to which has been added a solution of caustic alkali and a material of the class consisting of humic, gallic, tannic, quercitannic and lignic acids.

6. A method for retarding the initial set of a Portland type cement for use at high temperatures which comprises adding to the cement an alkali and a material of the class consisting of humic, gallic, tannic, quercitannic and lignic acids.

7. In the cementing of casing in an oil well in which the cement must set at a relatively high temperature, the step of retarding the initial set of the cement by incorporating into it a solution of caustic alkali and quebracho extract.

GEORGE E. CANNON.
JAMES L. FOSTER.